L. Brauer,
Apps. for Manf. Extracts.
No. 113,844. Patented Apr. 18, 1871.
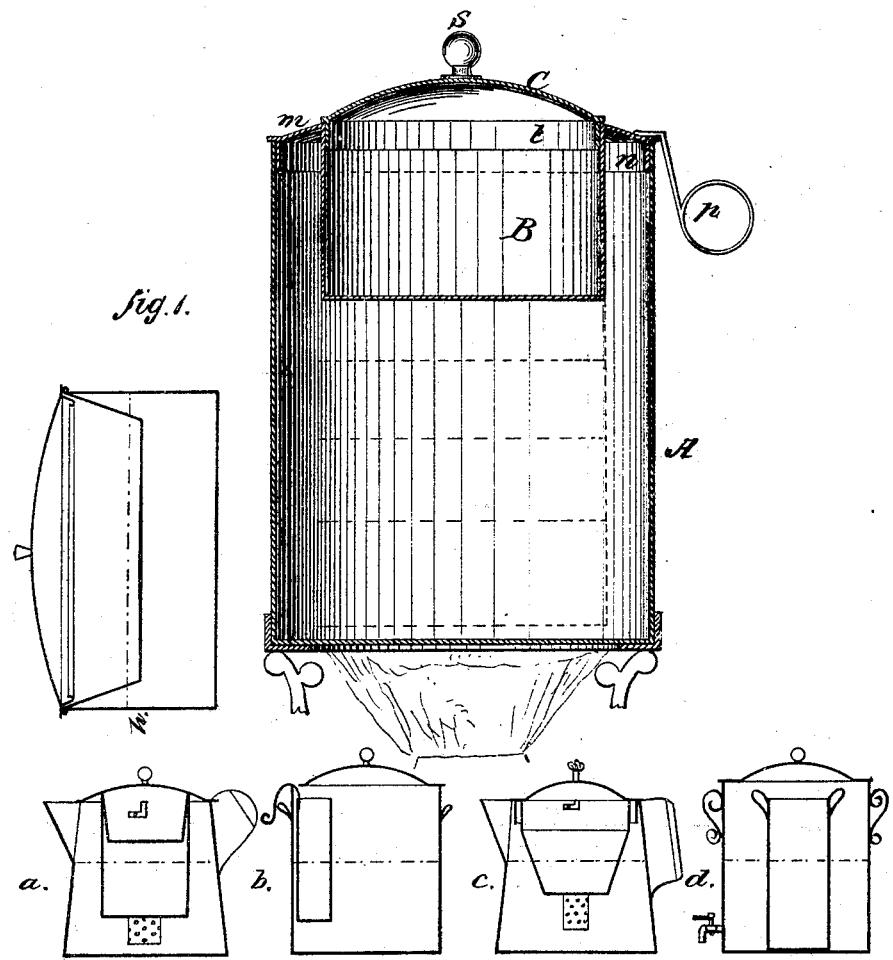
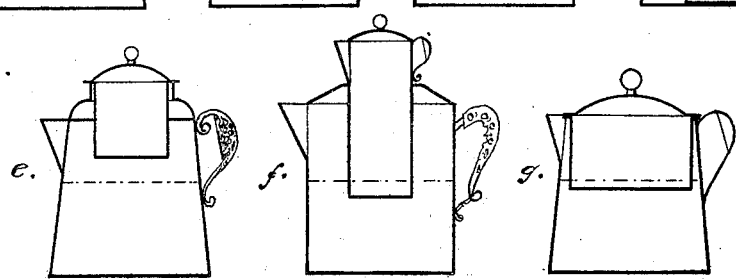
Witnesses:
Victor Hagmann
Jno. D. Patten
Inventor:
Louis Brauer

United States Patent Office.

LOUIS BRAUER, OF PHILADELPHIA, PENNSYLVANIA.

Letters Patent No. 113,844, dated April 18, 1871.

IMPROVEMENT IN APPARATUS FOR MAKING EXTRACTS FROM VEGETABLE AND ANIMAL SUBSTANCES.

The Schedule referred to in these Letters Patent and making part of the same.

*To all whom it may concern:*

Be it known that I, LOUIS BRAUER, of the city and county of Philadelphia and State of Pennsylvania, have made a new and useful Improvement in Apparatus for Making Extracts, Decoctions, Tinctures, and the like, from Vegetable and Animal Substances; and I hereby declare the following to be a full and exact description of the same, reference being had to the accompanying drawing.

Heat is a necessary agent in obtaining solutions and extracts from vegetable and animal substances.

The liquid used should be kept as near as possible to the boiling point without actual boiling, so as to drive off the aroma or more volatile portions of the extract.

The object of my invention is to construct simple and convenient apparatus on this principle.

In former patents issued to me, dated December 1, 1868, and March 15, 1870, I have described such apparatus.

My present invention consists in certain modifications whereby the object is accomplished with greater certainty and simplicity.

In the drawing—

Figure 1 shows the general construction of my apparatus.

Figure 2 shows other forms or modifications, *a, b, c, d, e, f, g,* and *h,* so as to adapt the apparatus to various uses.

The apparatus is composed of a vessel or boiler, A, and extractor, B, and a cover, C.

The boiler A may be of any form or size desired. It must, however, be large enough to contain the vessel B, and also sufficient water to furnish steam to heat the vessel B during the length of time required to produce the extract. This will, of course, vary with the material treated.

In fig. 1 the extraction-vessel B is attached to and forms the cover of vessel A—that is, to the upper side of vessel B is fixed a flange, *m,* turned down as shown at *n,* so that when vessel B is placed in the position shown in the drawing it closes the top of vessel A.

A handle, *p,* is attached to flange *m,* so as to lift vessel B off from vessel A.

The vessel B is provided with cover C, provided with knob *s* and flange *t.*

In forms *a* and *c* the cover of vessel B is held on by a bayonet-joint.

In forms *b* and *d* vessel B is placed entirely inside of vessel A, which is provided with hasp and stopple, so as to be locked.

In forms *e* and *f* the vessel B is made to project considerably above vessel A.

In form *g* vessel B is made large enough to fit into and fill the mouth of vessel A.

In forms *a* and *c* the bottom of vessel B is provided with a projecting perforated tube, to serve as a handle to turn vessel B while emptying its contents.

It will be readily seen that other similar modifications may be made, each, however, embracing the essential parts shown in fig. 1.

The method of using my invention is as follows:

Vessel A is charged with sufficient water to boil during the time required to make the extract.

The material from which the extract is to be made is placed in vessel B, together with the proper liquid to form the extract.

Vessel B is then closed and placed in vessel A so as to close it, and heat applied so as to boil the water in vessel A.

Neither the water nor the steam in vessel A comes in contact with the contents of vessel B.

It is not important, generally, to be particular as to the exact length of time that vessel B is subjected to the heat in vessel A. In fact, one of the important advantages of my invention is that vessel B may be left in vessel A an indifferent length of time without dissipating or expelling the aroma or essences that may be dissolved in vessel B.

This makes my apparatus of especial use for families, apothecaries, chemists, dyers, restaurant-keepers, and many others.

The vessel A may be arranged so as to be heated over a stove, open fire, gas-burner, or suitable lamp.

My invention is applicable to tea and coffee-pots of any of the ordinary forms; also to vessels such as are used now for making beef-tea, jellies, extracts of roots, herbs, and other substances.

For apothecaries and others, in making tinctures, this apparatus will have great advantages.

The contents of vessel B may be treated with the proper solvent as often as required.

When used in making tea or coffee, after the extract is formed in vessel B, it may be poured off into vessel A, with the proper amount of water.

My apparatus will be found exceedingly convenient in the sick-room, as by it all the food and drink required by the sick person may be kept ready prepared in the most palatable form, and without danger of spoiling either by becoming overcooked or cold.

Wine, spices, and any suitable flavoring material may be placed in vessel B with the proper solvent and the material from which the extract is to be made.

I do not claim the application of a water or steam-jacket to a vessel used for making extracts from vegetable or animal substances, as these are well known.

Nor do I claim simply placing one vessel within another to be boiled.

But my invention consists in providing apparatus of simple and convenient form so as to practically carry out the making of extracts of the several kinds herein above mentioned.

My invention is also applicable for other purposes.

By placing a projecting rim around the cover of vessel B, as shown in form *h*, any steam rising in vessel B will be condensed and collected. This vessel is suitable for cooking puddings and other articles.

Having thus described my invention,

What I claim, and desire to secure by Letters Patent of the United States, is—

1. The combination and arrangement of a boiler and an extractor so as to operate substantially as herein set forth.

2. The vessel A, in combination with the removable vessel B, as and for the purposes set forth.

LOUIS BRAUER.

Witnesses:
T. C. CONNOLLY,
B. S. HEDRICK.